Feb. 23, 1926.

J. W. BRUNDAGE

STEERING GEAR CHECK

Filed Jan. 10, 1925 2 Sheets-Sheet 1

Inventor:
James W. Brundage,

Feb. 23, 1926.
J. W. BRUNDAGE
1,574,601
STEERING GEAR CHECK
Filed Jan. 10, 1925      2 Sheets-Sheet 2
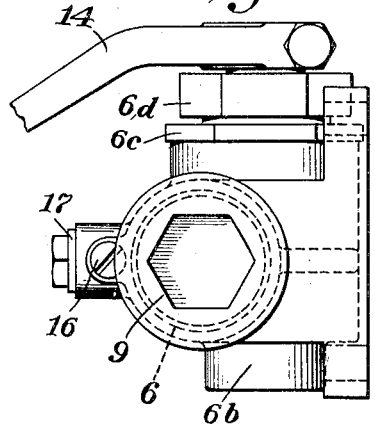
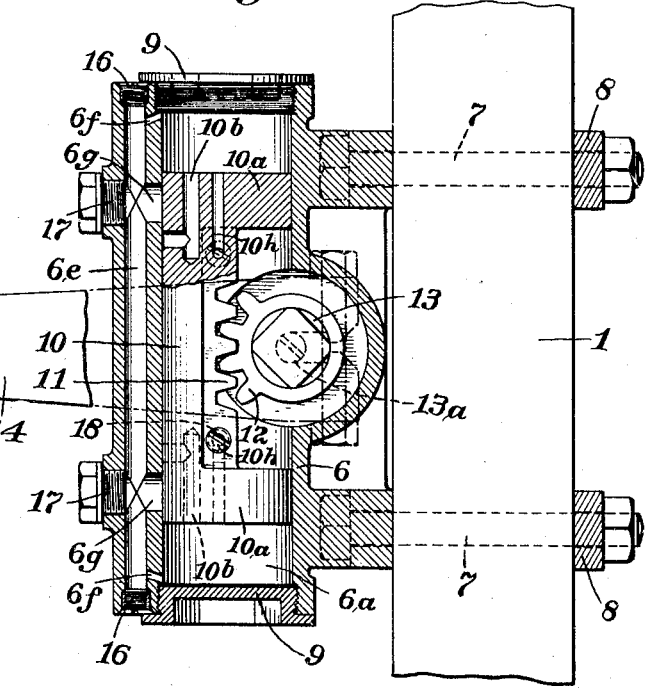
Inventor:
James W. Brundage,
by *Shea Middleton Donaldson & Hall*
Attys.

Patented Feb. 23, 1926.

1,574,601

UNITED STATES PATENT OFFICE.

JAMES W. BRUNDAGE, OF AKRON, OHIO, ASSIGNOR TO THE MILLER RUBBER COMPANY, OF AKRON, OHIO, A CORPORATION OF OHIO.

STEERING-GEAR CHECK.

Application filed January 10, 1925. Serial No. 1,629.

*To all whom it may concern:*

Be it known that I, JAMES W. BRUNDAGE, a citizen of the United States, and resident of Akron, in the county of Summit and State of Ohio, have invented certain new and useful Improvements in Steering-Gear Checks, of which the following is a specification.

My present invention relates to improvements in devices for checking the movement between two elements which are movable one with respect to the other, and is specifically designed as a checking device for the steering mechanism of motor vehicles.

The invention aims to provide a simple, economical, and efficient device which can be readily applied to any of the ordinary motor vehicles in use, to prevent the "chattering" or wabbling motion of the front wheels. This "chattering" motion is particularly liable to occur in cars which are equipped with balloon tires and front wheel brakes.

The invention further aims to provide a device of this character which will stabilize the steering mechanism so that under normal conditions the car will be guided in a rectilinear path and be restrained by the device against being accidentally deflected therefrom, while at the same time the wheels may be deflected by the steering wheel without undue interference, for turning purposes, and when deflected but a slight distance from normal alignment, will be entirely free from any checking or restraining action.

With these and other objects in view which will hereinafter appear, the invention includes the novel features of construction and arrangement and combination of parts hereinafter described, and particularly defined in the appended claims.

An embodiment of my invention is illustrated in the accompanying drawings, in which:—

Figs. 3 to 5 are detail views on a larger scale.

Figure 1:
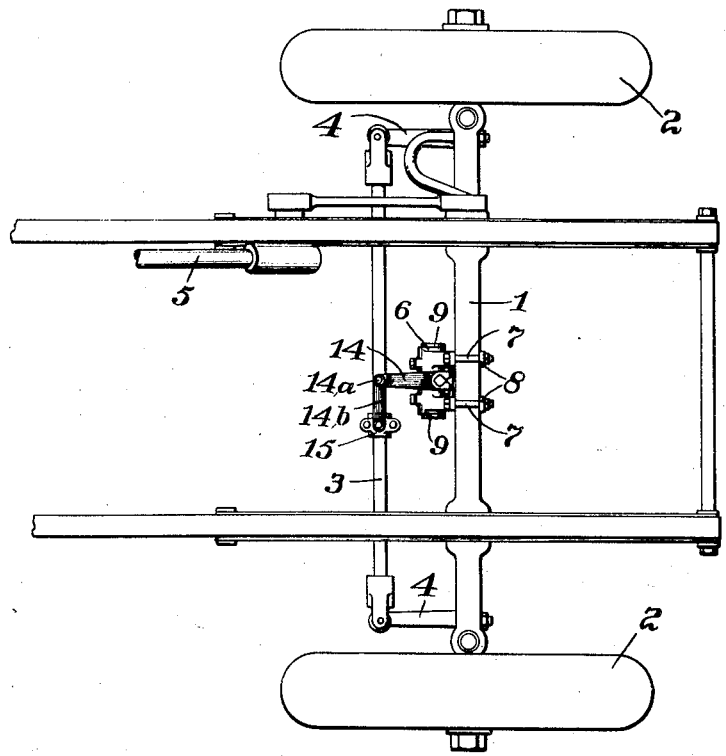
Figure 1 is a plan view of a diagrammatic or conventional nature, showing a sufficient portion of the front end of a motor vehicle chassis to illustrate the application of the invention.
Figure 2:
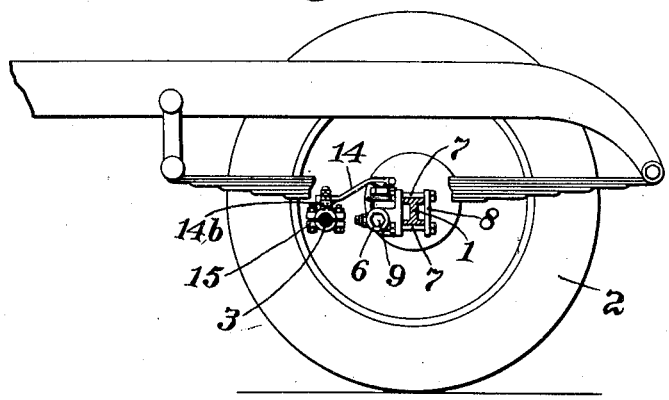
Fig. 2 is a side elevation of the same partly broken away.

Referring by reference characters to these drawings, the numeral 1 indicates the front axle of a motor vehicle, to the ends of which the steering wheels 2 are secured by the usual stub axles, the steering movement of which is controlled by the tie rod 3 connected to the stub axle arms 4, movement being imparted from the steering wheel shaft 5 by the customary connections shown conventionally at the top of Fig. 1, and which is so well known that detailed description thereof is deemed unnecessary.

My checking device comprises a cylinder 6 which may conveniently be formed as a casting, and which is appropriately provided on one side with means for attachment to the vehicle axle. In the present instance, the cylinder is shown as adapted for attachment to an axle of the I-beam type, and to this end has a flat face adapted to be bolted to the axle by means of bolts 7 and clamping plates 8. The cylinder is preferably bored completely through from end to end to form a cylinder space or piston chamber $6^a$, the ends of which are closed by screw threaded plugs 9. Within this cylinder is located a double headed piston member 10 having piston heads $10^a$ of suitable width, and an intervening space which is adapted to enable the piston to be operatively connected to the actuating means. The preferred form of actuating means comprises a rack member 11 which may be made integral with the piston, and the teeth of which are engaged by the teeth of a gear segment 12 carried by, or integral with, a shaft member 13. The cylinder casting is bored transversely of, and off center, relative to the piston chamber, to provide an enlarged recess to receive the gear segment, and a reduced bearing portion $6^b$ to receive and form a bearing for the lower end of the shaft 13, the upper end of the shaft being journaled in a closure bushing $6^c$ secured in any suitable manner, and the shaft being further provided with the usual packing gland indicated at $6^d$. Shaft 13 engages at its outer end an actuator arm 14, the free end of which is pivotally connected at $14^a$ to one end of a link $14^b$ provided with suitable clamping means, such as a divided clamp 15, which may be readily attached to the tie rod 3.

The cylinder casting 6 is provided with a longitudinal passage $6^e$ which may be conveniently bored entirely through the casting from end to end and have its ends closed by screw plugs 16, which screw plugs are preferably held in position against accidental displacement by the overlapping flanges of the cylinder heads 9. Restricted ports 6$^f$ connect the opposite ends of the cylinder chamber with the passage 6$^e$ so that if force is applied to the piston tending to move it in one direction or the other, movement will be resisted or checked until the fluid can transfer itself from one end of the cylinder to the other by way of these restricted by-passes 6$^f$ and the passage 6$^e$. In practice, the by-passes are made of such size that the transfer of fluid under the slight pressure which entails the "chattering" action, or natural tendency of deflection in road work, will be resisted, while at the same time not interfering seriously with the deflection of the wheels under the action of the steering wheel. The passage 6$^e$ is in communication with the interior of the cylinder by two ports 6$^g$, of greatly increased area, and it will be seen from Fig. 3 that these ports are of such area that they are normally covered by the piston.

Preferably the piston construction includes ports 10$^b$ which lead from the outer faces or ends of the piston to a point in the piston wall sufficiently remote from the faces. It will thus be seen that if the piston is moved in either direction for a certain distance, the opposite ends of the cylinder will be placed in relatively free communication due to the uncovering of one of the ports 6$^g$ by the piston and the corresponding alignment of passage 10$^b$ with the other port 6$^g$. This allows free and unrestrained movement of the steering wheels through any remaining desired angle and back, but as soon as the wheels have been straightened out to pursue a rectilinear course, the checking or restraining action will be automatically resumed.

Preferably, and for convenience in manufacture, the ports 6$^g$ are formed by boring through the cylinder casting walls from the outside, closure being effected by the plugs 17. It will be noticed that the by-passes 6$^f$ are disposed at an angle and located closely adjacent the closure heads 9, so that these may be easily bored before the said closure heads 9 are placed in position.

For conveniently filling the device with fluid and for supplying additional fluid to compensate for leakage, should such occur, I preferably provide the shaft member 13, with a longitudinal bore 13$^a$ which communicates by an angular extension with the space in which the gear works, and this space is in communication with the opposite ends of the cylinder by ports 10$^h$, which are provided with check valves 18 which open automatically to allow the fluid to flow to the opposite ends of the cylinder, but close to prevent any return thereof. The outer end of the passage 13 may be closed by a screw plug 19 or provided with any other approved means for permitting fluid to be introduced, but preventing exit thereof.

Any approved incompressible fluid may be used which should be of the non-freezing character, such as oil, glycerine, or the like.

Having thus described my invention, what I claim is:—

1. In a device for checking the movement between two elements which are movable one with respect to the other, a cylinder affixed to one of said elements, a pair of connected pistons therein having their acting faces equidistantly spaced from the cylinder heads when in neutral position, there being restricted bypass ports for fluid between the opposite ends of the cylinder, and relatively large bypass ports in the cylinder wall which are closed by the piston when in neutral position, and uncovered by movement of the piston in either direction whereby resistance to the piston movement is removed, and an actuator operatively connecting said piston to the other element.

2. In a device of the character described, a cylinder block having a piston chamber therein and a passage parallel thereto, a double headed piston is said chamber, there being restricted bypass ports connecting the ends of the cylinder with said passage, and other ports of larger area between said chamber and passage which are positioned to be closed by said piston when in neutral position and opened on movement of the piston in either direction from neutral position, to permit free transfer of liquid between opposite ends of the cylinder, and an actuator for said piston.

3. In a device of the character described, a cylinder block having a cylinder chamber bored completely therethrough, heads closing the ends of the cylinder and forming a piston chamber, said block having a passage bored therethrough parallel to said chamber, plugs closing the ends of the passage, there being inclined restricted bypass ports connecting the ends of the piston chamber with said passage, a double headed piston member in said chamber, said cylinder block having transverse passages leading from the chamber in line with the piston heads (when in neutral position) to the outside and intersecting said parallel passage, plugs closing the outer ends of the transverse passages, and an actuator for the piston member.

4. In a device of the character described, a cylinder member, a double headed piston therein having a reduced central portion, there being a restricted bypass connection between opposite ends of the cylinder and relatively larger bypass connections which are normally closed but are uncovered by movement of the piston member in either direction, a rack carried by the reduced portion of the piston member, a transverse shaft journaled in said cylinder member, a gear member carried by said shaft and meshing with the rack, and an actuator arm carried by said shaft, said shaft having a fluid admitting passage therethrough leading to the space between the piston heads, and the piston heads having passages leading from said space to the outer faces of the pistons, and check valves in said passages.

5. In a device of the character described, a cylinder member, a double-headed piston therein, said cylinder wall having a longitudinal passage of relatively large area, restricted by-pass ports connecting said passage with the opposite ends of the cylinder respectively, relatively large ports connecting said longitudinal passage with the cylinder and positioned to be both closed by the piston when in neutral position, but being adjacent the ends of the piston, said piston having a passage of relatively large area leading from its end face to its side wall in position to align with the ports of large area in the cylinder wall, said passages in the cylinder ends being so arranged that when the piston is moved in a direction to cause one end to uncover the corresponding port of large area in the cylinder wall, the passage in the opposite end of the cylinder is placed in communication with the other port of large area.

In testimony whereof, I affix my signature.

JAMES W. BRUNDAGE.